March 19, 1963  J. E. MINTY  3,081,883
STEERABLE GANTRY CRANE
Filed Aug. 3, 1960  9 Sheets-Sheet 2

Inventor
John E. Minty

March 19, 1963

J. E. MINTY 3,081,883

STEERABLE GANTRY CRANE

Filed Aug. 3, 1960

Inventor
John E. Minty
by Hill, Sherman, Meroni, Gross & Simpson
Attys.

March 19, 1963 J. E. MINTY 3,081,883
STEERABLE GANTRY CRANE
Filed Aug. 3, 1960 9 Sheets-Sheet 6
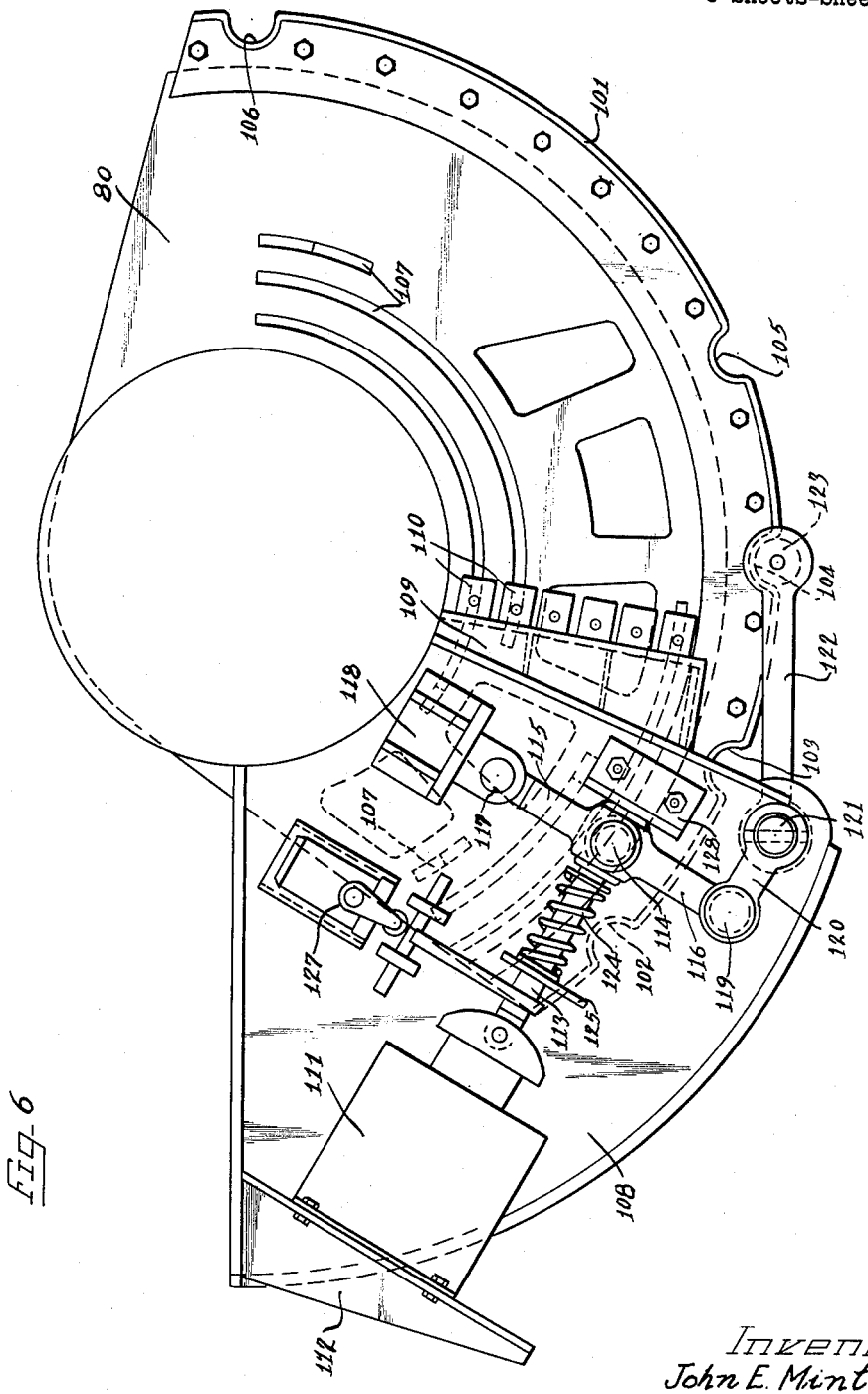
Inventor
John E. Minty
by Hill, Sherman, Meroni, Gross & Simpson
Attys.

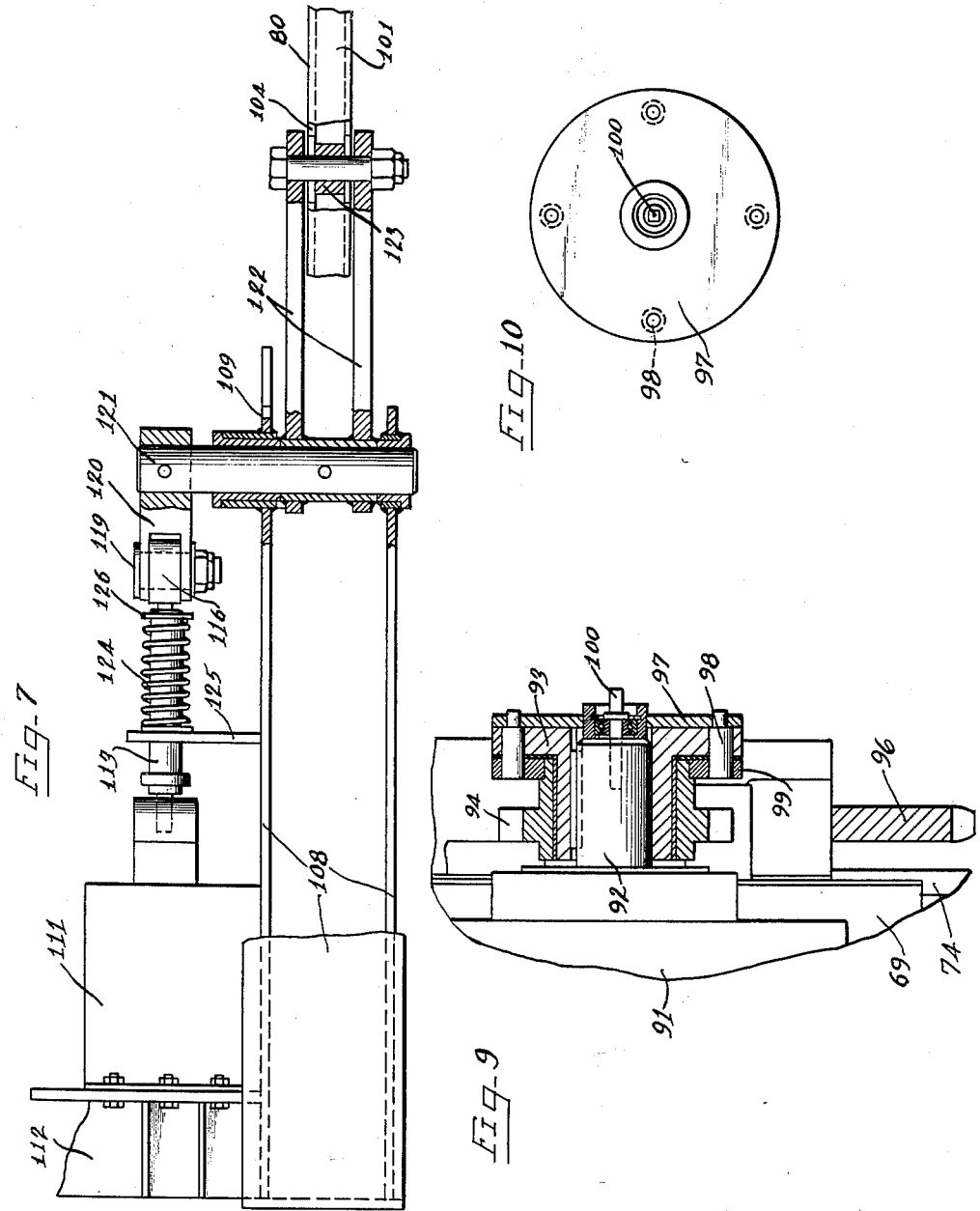

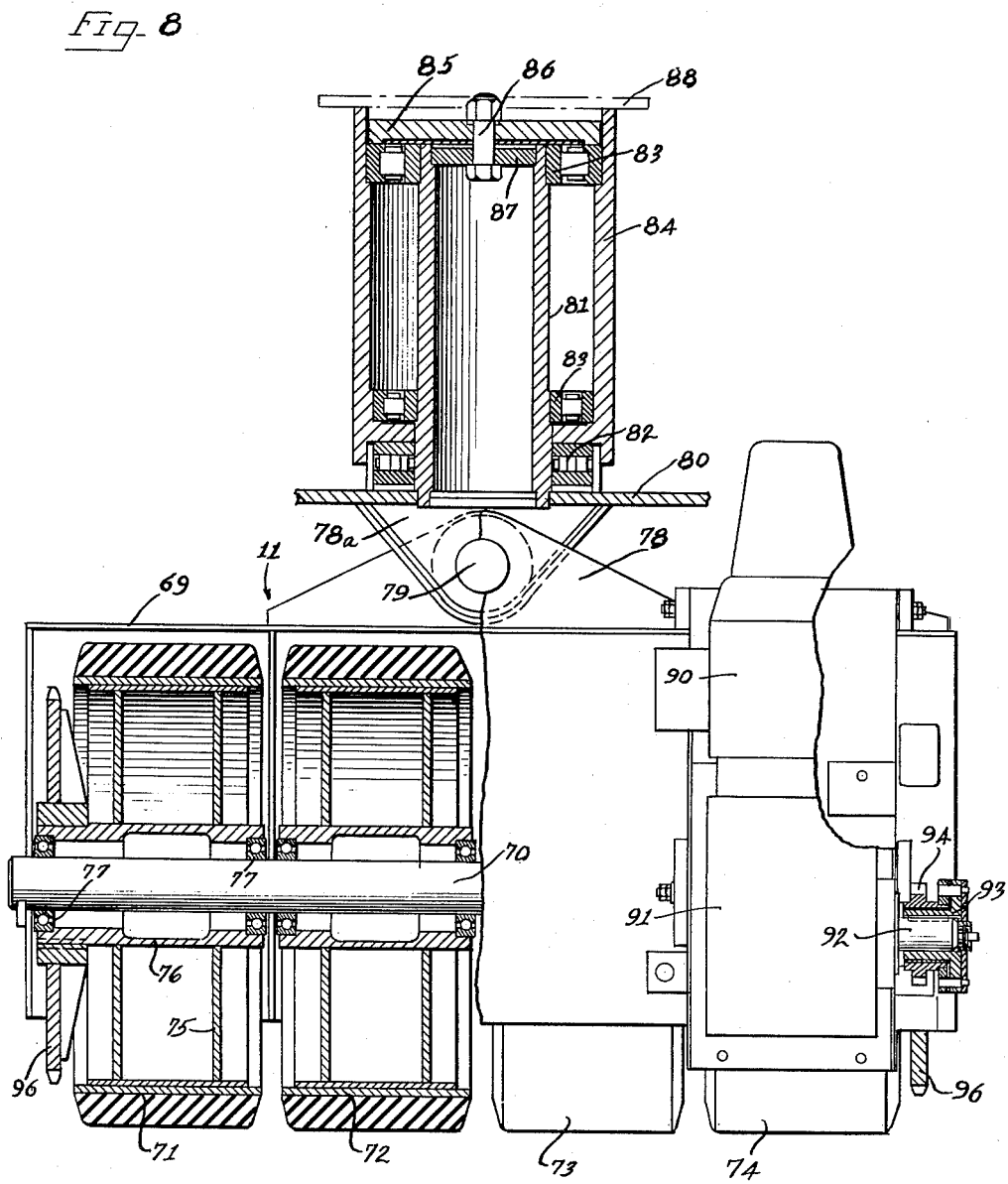

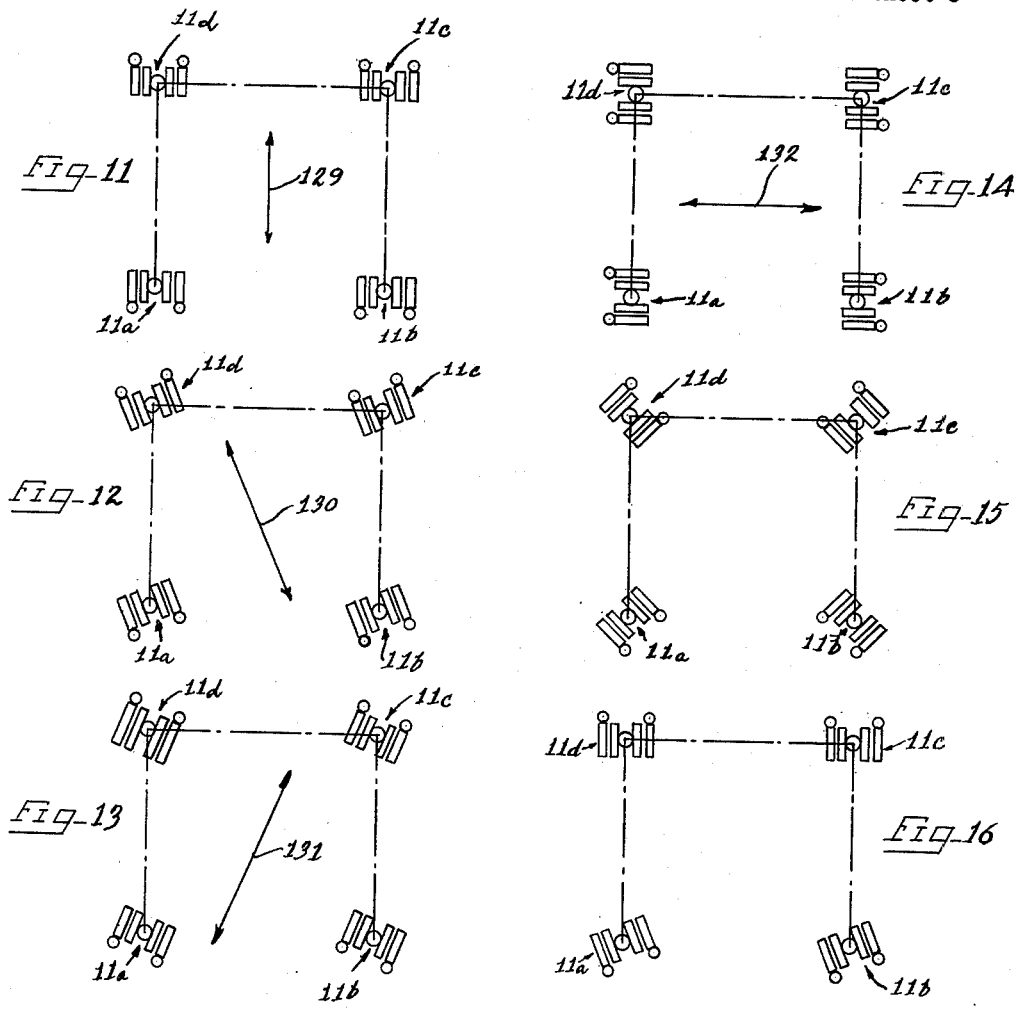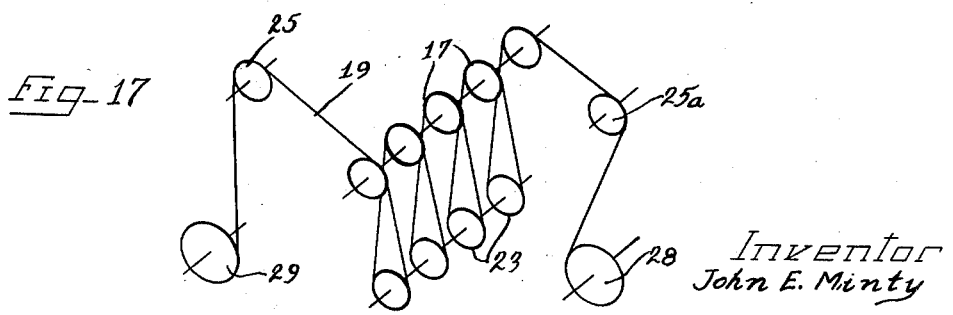

United States Patent Office 3,081,883
Patented Mar. 19, 1963

3,081,883
STEERABLE GANTRY CRANE
John E. Minty, North Muskegon, Mich., assignor to Manning, Maxwell & Moore Incorporated, Muskegon, Mich., a corporation of New Jersey
Filed Aug. 3, 1960, Ser. No. 47,245
20 Claims. (Cl. 212—13)

This invention relates to a steerable gantry crane, and more particularly to a gantry crane that may be towed from location to location and operable under its own power at a working location, including traversing movements, and which is designed to elevate heavy or light loads relatively long distances, the crane being operable on land or on shipboard and is highly desirable for elevating and lowering loads through an opening such as a hatch out of and into ship holds, basements and sub-basements, and other similar locations, although the invention will have other uses and purposes as will be apparent to one skilled in the art.

In the past, various forms of gantry crane of the type that straddle a load have been developed but in most instances of which I am aware, such formerly known gantry cranes, if capable of handling loads exceeding 75 tons were too unwieldy, cumbersome, difficult to handle, and entirely too heavy for use on shipboard. Formerly known gantry cranes of this general type also embodied expensive and cumbersome slow acting and inaccurate steering mechanism, and it was objectionably difficult, if not impossible in many cases, to properly center the gantry crane over a load or accurately position the gantry crane, particularly in highly restricted areas. In no instance of which I am aware was it heretofore possible to move a gantry crane, free and unanchored, in substantially any desired direction from a straight forward or reverse movement to a direct sidewise movement. In addition, it may be mentioned that formerly known gantry cranes, particularly those designed for heavy duty, did not have a structure capable of equalizing the load on all four corners of the crane or on the trucks disposed at those corners, were not desirably stable owing to high positioning of hoisting mechanism, could not perform the desired movements including traversing of trolleys without the use of objectionably heavy mechanism, and were not capable of elevating or lowering loads a desired distance without the use of extra heavy and oversize equipment. It might also be mentioned that gantry cranes of this general type heretofore known could not be adjusted for either towing or self-powered operation in an extremely short time and with the aid of but a simple tool, and were subject to objectionable stresses and strains due to unbalancing by virtue of tires squeegeeing under load, particularly where a multiple-wheel truck was utilized under each corner of the frame structure.

With the foregoing in mind, it is an important object of the instant invention to provide a durable, accurately manipulatable steerable gantry crane that overcomes the above noted objections.

Another object of this invention is the provision of a steerable gantry crane capable of handling extremely heavy loads which possesses many advantages not obtained in gantry cranes of the same general type heretofore known.

Another object of the instant invention is the provision of a steerable gantry crane in which the drive motors for traversing the entire crane are mounted on the wheeled trucks under each corner of the frame.

Still another and highly important object of the instant invention is the provision of a steerable gantry crane in which the same mode of power utilized to effect travel of the entire crane structure is also utilized to steer the crane in the desired direction of travel.

A further feature of the instant invention resides in the provision of a gantry crane having a multiple-wheeled truck under each corner of the frame with separate motors driving the inner and outer wheels of each truck, which motors may be operated in opposite directions, and which motors are also utilized to position the trucks for travel of the crane in a desired direction.

Also a feature of this invention is the provision of a steerable gantry crane that may readily travel forward and reverse in substantially any direction including straight ahead, skewed right, skewed left, directly sidewise, or rotate substantially about the center point of the crane structure or rotate in a circle of larger diameter.

Another desideratum of the instant invention is the provision of a steerable gantry crane utilizing a multiple-wheeled truck under each corner of the frame with rubber or equivalent tires on each wheel, the structure being such that no undue strain is placed upon the frame or other parts of the mechanism nor any adverse effect caused by squeegeeing of the tires, the crane being capable of substantially universal movement without undue scuffing of the tires.

Still another desideratum of this invention resides in the provision of simple, positive, and quick acting locking mechanism to hold each truck of the gantry crane in a desired position of adjustment for travel of the gantry crane in a predetermined direction.

A further feature of the invention resides in the provision of a heavy duty gantry crane having the heavier hoisting mechanism positioned at an extremely low point on the frame, giving the entire crane structure a low center of gravity, eliminating top heaviness and adding greatly to the stability of the structure, particularly when under load.

It is also a feature of this invention to provide a heavy duty gantry crane in which double and opposed hoisting drums are utilized, driven in opposite directions and acting upon the same cable, such drums being geared together for synchronous operation, whereby a single motor of relatively light weight and power could be utilized to lift and lower loads a relatively great distance and the hoisting drums need not be oversize.

It is still a further feature of the instant invention to provide a gantry crane equipped with a novel cable reeving arrangement permitting a relatively great distance of travel for the load with the hoisting mechanism being of relatively small size.

Still another feature of the invention resides in the provision of a cable reeving arrangement that aids in locking the trolley of a gantry crane structure in any position by virtue of the load lead line pulls offsetting each other equally at the trolley, whereby only a relatively small motor need be utilized to effectively traverse the trolley.

A further object of the instant invention is the provision of a simple and positive traverse drive for the trolley on a heavy duty gantry crane.

It is still another desideratum of this invention to provide a heavy duty gantry crane with the frame thereof so constructed as to automatically distribute the load evenly to the four corners of the crane structure.

While some of the more salient features, characteristics and advantages of the instant invention have been above pointed out, others will become apparent from the following disclosures, taken in conjunction with the accompanying drawings, in which:

FIGURE 6 is an enlarged fragmentary plan view of one of the locking arrangements for the trucks, such locking arrangements being seen in plan in FIGURE 4, one associated with each truck;

FIGURE 7 is a fragmentary side elevational view of the structure of FIGURE 6 taken from the bottom side of the figure, with parts omitted, parts broken away, and parts shown in section;

FIGURE 8 is an enlarged fragmentary part sectional, part elevational view of one of the multiple-wheeled trucks and the spindle connecting it to the frame of the gantry crane;

FIGURE 9 is a fragmentary enlargement of the lower right-hand portion of FIGURE 8;

FIGURE 10 is a face view of the clutch member, taken from the right-hand side of FIGURE 9;

FIGURES 11, 12, 13, 14, 15 and 16 are diagrammatic showings indicating various positions of adjustment for the trucks for various directions of travel of the gantry crane; and FIGURE 17 is a diagrammatic illustration of the reeving of the cables in the heavy duty hoisting mechanism.

As shown on the drawings:

Figure 1:
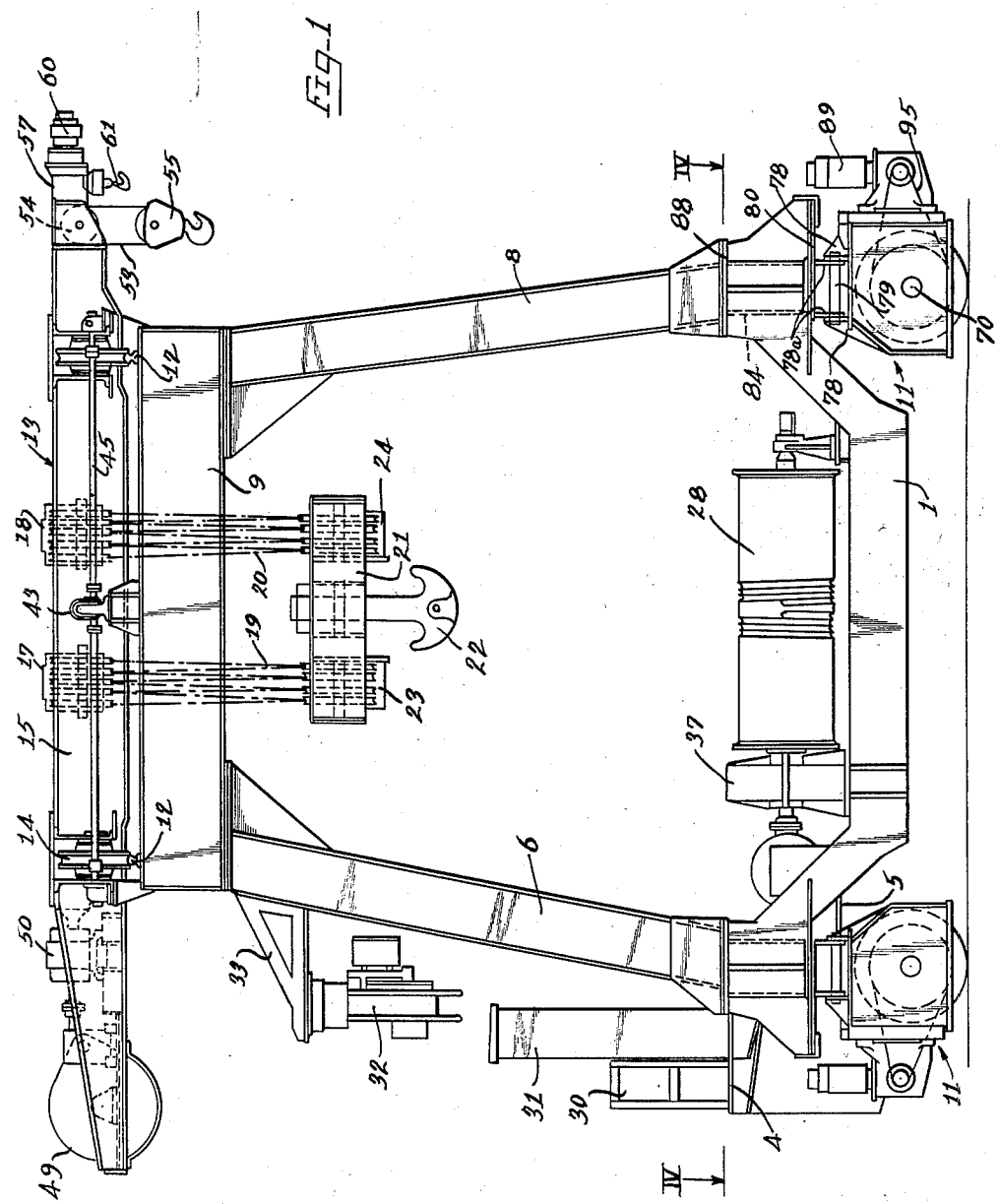
FIGURE 1 is a side elevational view of a gantry crane embodying principles of the instant invention.
Figure 2:
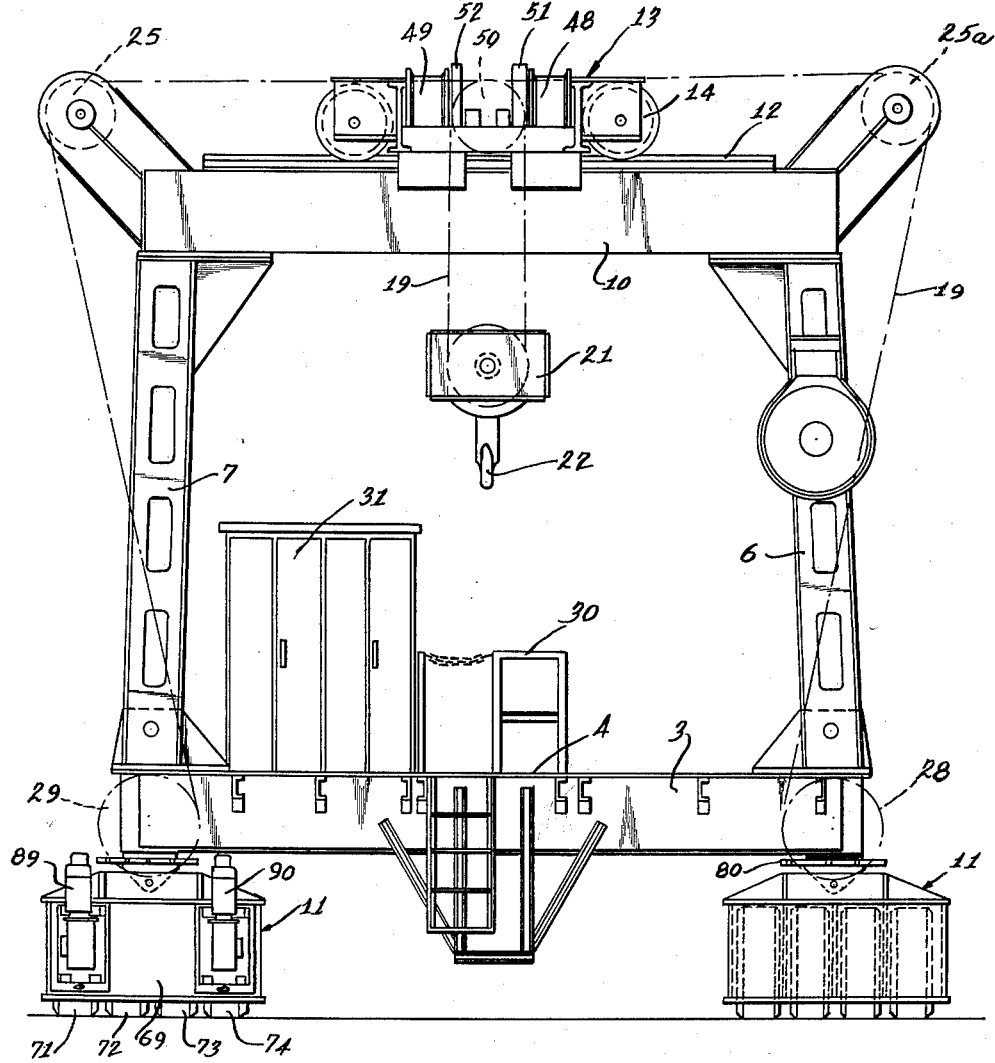
FIGURE 2 is an end elevational view of the structure of FIGURE 1, with parts omitted, this end being termed the rear end of the gantry crane herein for purposes of clarity.

It will be understood that in gantry cranes of the general charcter set forth herein, various auxiliary lifts may be employed in desired sizes and numbers, and other various changes will be made frequently in commercial structures, particularly when a gantry crane embodies specifications for particular duties. It will also be understood that internal combustion engines may be incorporated as driving means in various locations, if desired, changes in the number of wheels for each truck may be specified as well as changes in the character of the wheels depending upon the location in which the grantry crane is to operate, etc., and such changes in structure may, of course, be employed without departing from the principles of the instant invention.

Accordingly, by way of example and not by way of limitation, I have selected a gantry crane in which the moving parts are actuated by electric motors, the gantry crane being towed from one location to another, and when in a working location, may be energized from any suitable local source of electric energy by way of suitable conductor cables of sufficient length. The use of electrical motors to operate the various movable parts of the gantry crane are preferable because of the quickness of control and versatility of movement of the parts obtainable from such motors with a minimum of effort on the part of the operator, since only one operator is necessary on the crane itself.

It should also be understood that while rather complicated electrical circuits are necessary in order to control the various parts of a gantry crane of this type, such circuits are not shown or described herein, because the wiring of a machine of this character as well as the component electrical parts and apparatus are usually furnished by some other than the manufacturer of the machine. The electrical circuit per se, therefore, forms no part of the instant invention, and it is to be assumed that adequate wiring and electrical equipment is to be associated with the instant invention in order to effect the desired operation. The necessary switch panels, control boards, wiring and other electrical apparatus necessary are usually designed and installed by companies specializing in that field of endeavor, as is well known in the art.

*The Machine in General*

The main frame structure of the machine embodies a lower or chassis frame, upstanding frame means thereon, and a top frame connecting the upstanding members. The frame members are preferably fabricated girders of suitable size and shape to support the various components of the machine, carry the load, and allow room for movement of certain parts. The various frame members are connected together by bolts, rivets, or welding, as may be desired in accordance with standard machine assembly practice. The frame structure is best seen in FIGURES 1, 2, 3 and 4.

The lower frame portion includes a pair of similar opposed drop center girders 1 and 2 extending lengthwise of the machine, and a cross girder 3 connecting the rear ends of the girders 1 and 2, this frame portion being open at the forward end of the machine to enable the machine to straddle a load. The transverse girder 3 is further provided with a rearwardly extending floor section 4 to provide an operator's platform, and there is a transverse mechanism supporting platform 5 forward of the girder 3 and connected to both the side and rear girders.

Upstanding from the lower frame portion are four corner legs, including rear legs 6 and 7 which slope both forwardly and laterally inwardly, and a pair of forward corner legs 8, only one of which is visible in the drawings, which slope slightly inwardly and also rearwardly.

On top of the upstanding legs there is susbtantially a rectangular frame structure comprising opposed longitudinally extending girders 9—9, and a pair of opposed transverse girders 10—10. Thus, the lower or chassis frame portion is substantially integrally bonded to the four upright or corner legs and the rectangular frame structure at the top.

Under each corner of the frame structure a multiple-wheeled self-powered truck, generally indicated by numeral 11, is mounted for bodily rotation on a vertical spindle. These four trucks render the entire gantry crane mobile, and as will more fully later appear herein the trucks may be disposed at various angles to determine the direction of the crane.

The transverse girders 10—10 of the upper frame structure are each provided with a rail 12 thereby providing a track for a trolley, generally indicated by numeral 13, which is provided with suitable wheels 14 for riding the track. The trolley may be traversed backward and forward transversely of the crane structure. As seen best in FIGURE 3, the trolley embodies suitable side frame members 15—15, trucks 16—16, and other cross connecting girders, wherever deemed necessary. The trolley carries all of the auxiliary hoists and the drives therefor, as well as the multiple sheaves 17 and 18 over which the main hoisting cables or ropes 19 and 20 are reeved. Depending from the trolley on the cables 19 and 20 is a lifting beam 21 carrying the main lift hook 22. The lifting beam 21 also carries multiple sheaves 23 and 24 for the ropes 19 and 20 respectively. The central portion of the ropes are reeved around the trolley sheaves and the lifting beam sheaves, and from there the rope 19 passes over a sheave 25 on the upper frame structure at one side of the crane, and the other portion of this rope passes over a similar sheave 25a on the opposite side of the frame. In similar manner, the rope 20 is reeved over a sheave 26 at the top of the frame and the opposite portion over a sheave 27. Double rope drums 28 and 29 are mounted in the drop center portions of the chassis frame members 1 and 2 and both the ropes 19 and 20 are wound on each of these drums. The mechanism for driving the hoist drums 28 and 29 is carried on the platform 5 extending between the chassis girders 1 and 2 at the rear of the frame. Since this main hoisting mechanism is designed to elevate and lower loads in excess of 75 tons, the positioning of the drums and drive mechanism at a very low point on the frame lends stability to the entire crane structure.

On the aforesaid floor or deck 4 at the rear of the frame structure is the operator's control board 30, and a panel board 31 for the necessary electrical control devices. Power is supplied from any suitable source at the operation location and a suitable electrical cable take-up reel 32 is suspended from a bracket 33 at the rear of the frame.

The Main Hoisting Mechanism

Figure 4:
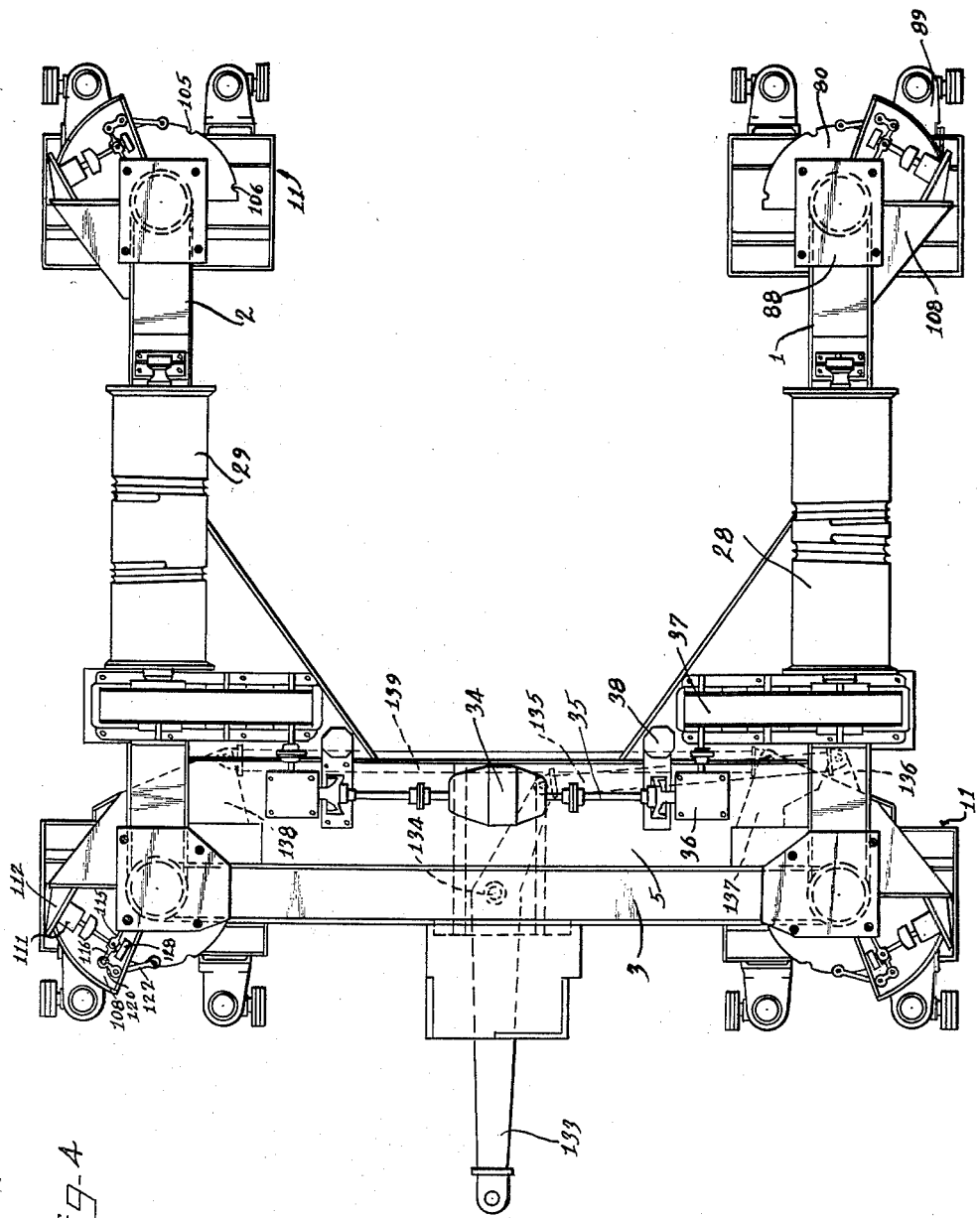
FIGURE 4 is a plan sectional view of the lower portion of the structure of FIGURE 1, taken substantially as indicated by the section line IV—IV of FIGURE 1, looking in the direction of the arrows.

The mechanism for raising and lowering the heavy load hook 22 is best seen in FIGURES 1 and 4. The two drums 28 and 29 located on the drop center chassis girders 1 and 2 are driven simultaneously by a motor 34 on the aforesaid frame platform 5. The longitudinal axis of the motor is disposed at right angles to the longitudinal axes of the drums, and the motor is preferably mounted midway between the drums. Identical drive mechanisms are disposed between the motor and the drums and each includes a motor shaft extension 35 leading into a speed reducer 36, which may be a worm reducer, and the output shaft of the reducer is coupled to the input shaft of a reduction gear train enclosed in a gear box 37, the respective cable or rope drum being directly connected to the last gear in the box 37. A magnetic brake 38 acts upon the respective motor shaft extension 35. Thus, the two opposed drums 28 and 29 are geared together and must accordingly operate in unison, but in opposite directions by virtue of one worm reducer 36 being left-hand while the other is right-hand. This drum arrangement permits taking up the necessarily large amount of rope or cable for a lift of relatively great height, with each drum being only of moderate size.

In FIGURE 17 I have diagrammatically illustrated the reeving for each of the ropes or cables 19 and 20. The rope 19, for example, has one end anchored to the drum 28 and its other end anchored to the drum 29. From the drum 28 the rope extends upwardly over the head sheave 25a on one side of the frame, and it is then reeved over the sheaves in the block 17 on the trolley and the block 23 on the cross head or lifting beam 21. The rope then passes over the head sheave 25 on the opposite side of the frame and on down to drum 29. With this reeving arrangement there are preferably eight parts of rope or cable between the blocks 17 and 23. The rope 20 is reeved in identically the same way. The number of parts of rope between the block sheave 17 and the lifting beam block 23 is not critical and may be varied to suit demands. There must be at least two parts of rope extending between the trolley to the lifting beam, and if more than two parts are needed to carry the load there should be an even number in multiples of two, such as four, eight, twelve, sixteen, etc.

It will therefore be seen that the lifting beam 21, hook 22, and the load carried thereby is suspended in the bights of the two ropes or cables, and this arrangement permits the trolley 13 to be traversed back and forth without any alteration in the vertical position of the load. The two motions, hoisting and trolley traversing, may take place at the same time, if desired, but it is only the hoisting machinery itself that raises or lowers the load as the trolley may traverse, the lead line pulls from the drums exactly offsetting each other. This provides the advantage of causing traverse of the trolley with only a relatively small force, and only a small traversing motor need be employed for the trolley.

The disposition of the drums and drive mechanism for the hoist at the bottom of the crane frame, rather than have such mechanism mounted on the trolley, adds to the stability of the gantry crane as a whole and eliminates any top heaviness of this structure, at the same time permitting the use of a relatively light trolley.

The Trolley Traverse Driving Means

Figure 3:
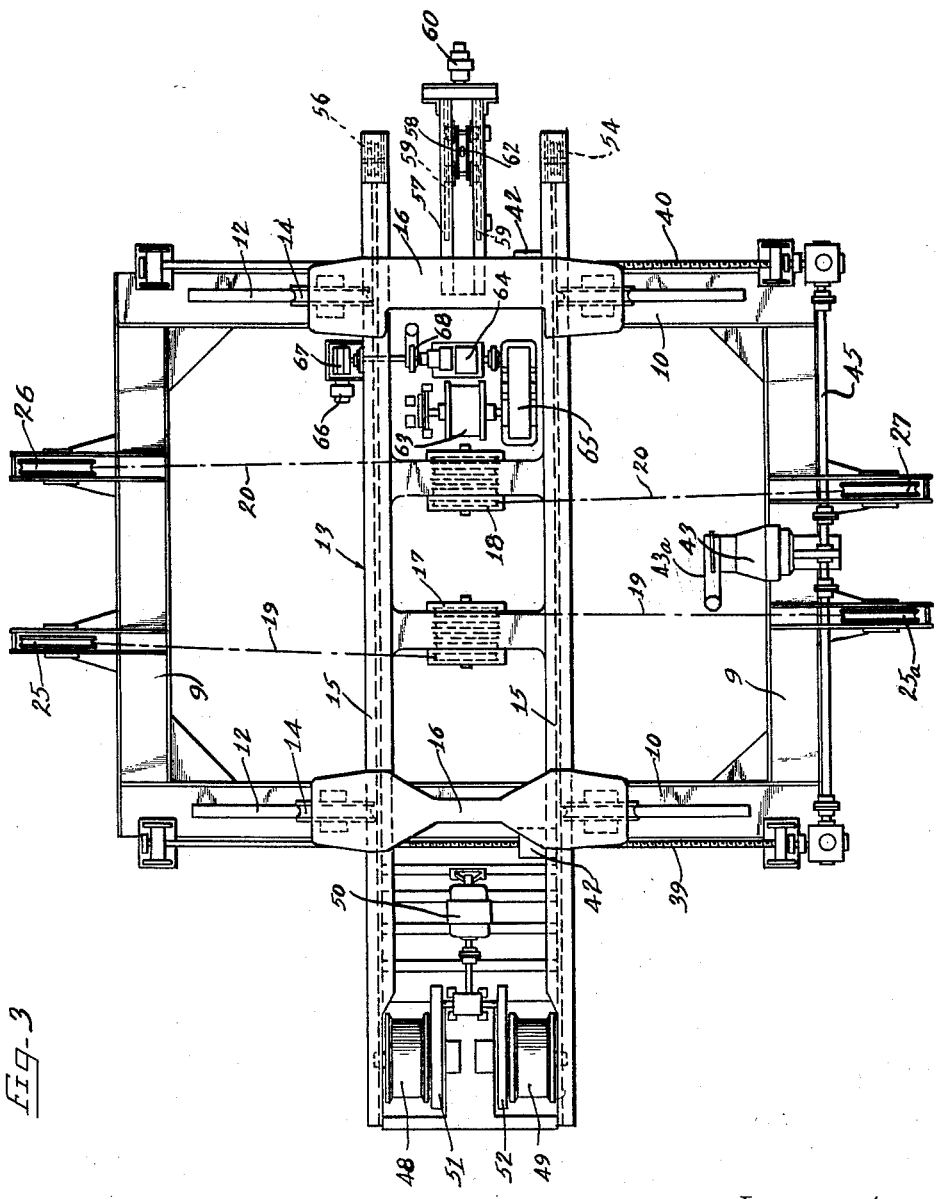
FIGURE 3 is a top plan view of the structure of FIGURE 1, with parts omitted.
Figure 5:
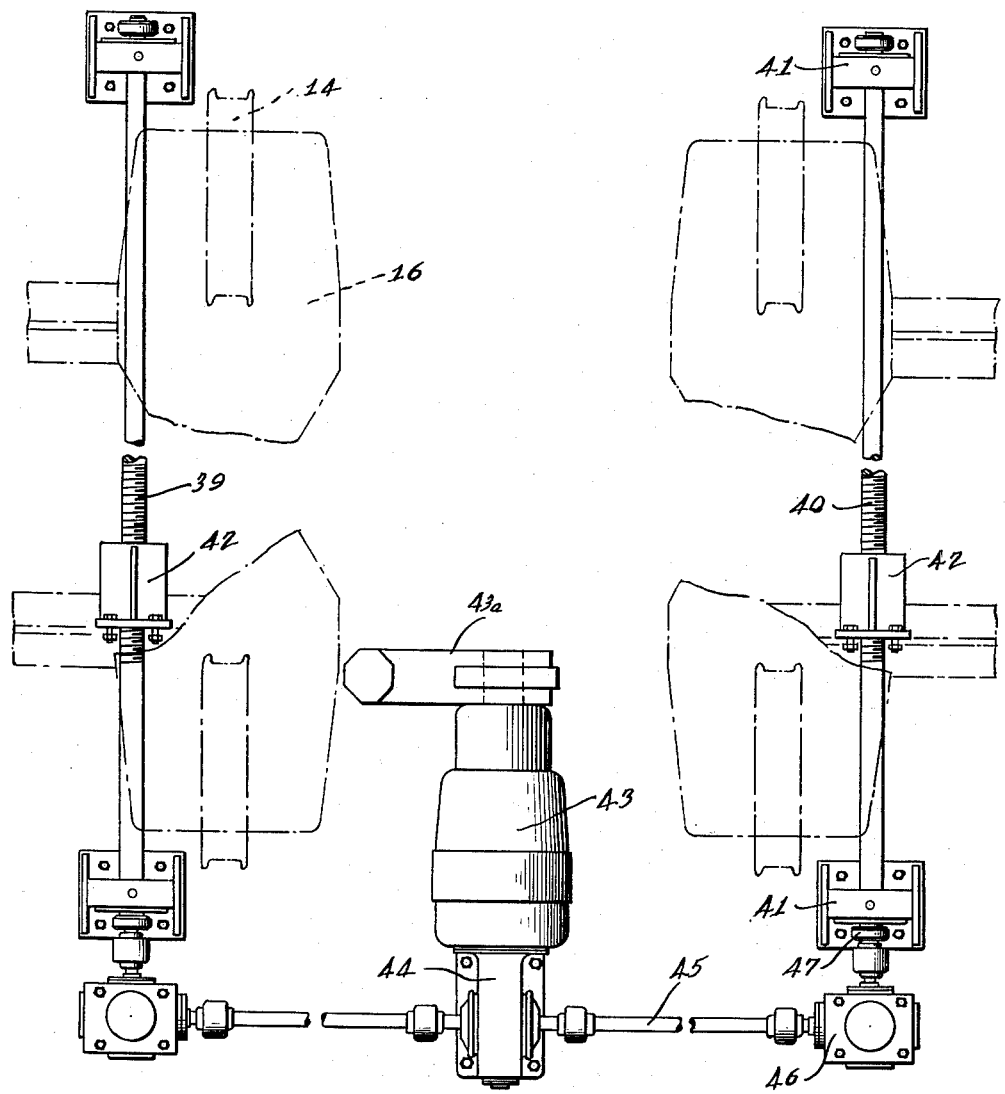
FIGURE 5 is a fragmentary enlargement of portions of the structure seen in FIGURE 3, with parts omitted for clarity, and illustrating the driving arrangement to effect traverse of the trolley.

With reference now more particularly to FIGURES 3 and 5, it will be seen that the mechanism for traversing the trolley 13 includes a pair of opposed lead screws 39 and 40 extending along the top girders 10—10 and mounted in suitable bearings 41. Each of these lead screws may consist of a suitable shaft having a threaded part of a length equal to the intended trolley traverse. Fixed to the trolley frame adjacent each truck is a nut 42 threaded on the respective lead screw, and preferably a self-lubricating type of nut.

The lead screws are geared together and driven in unison by a motor 43 having a speed reducing attachment 44 and disposed substantially midway of one of the top side girders 9. From each side of the speed reducer 44 a drive shaft extension 45 extends into a bevel gear box 46 which is in turn connected to the respective lead screw by a flexible coupling 47. Preferably all of the speed reduction is obtained at the reducer 44. Suitable gearing might be employed to cause the lead screws 39 and 40 to both rotate in the same direction, or on the other hand the two lead screws may be threaded oppositely to each other, one with a left-hand thread and one with a right-hand thread.

When the motor 43 is energized to rotate the lead screws, the trolley will be obviously moved transversely across the upper deck of the gantry crane to a desired extent. The trolley may be easily retained at any point desired by virtue of the low helix angle on the threads of the lead screws 39 and 40 and by an electric brake 43a acting on the shaft of motor 43 which, when actuated, prevents any rotation of the lead screws. Thus, there can be no movement of the trolley by any outside force acting upon it in either direction. It will also be noted that because of the reeving of the ropes 19 and 20, the height of the load does not change during traverse of the trolley unless the main hoisting mechanism is in operation at the same time.

The Auxiliary Hoisting Mechanisms

Auxiliary hoisting mechanism for considerably lighter loads than the hook 22 is designed to handle is mounted on the trolley 13.

With reference more particularly to FIGURES 1 and 3, it will be seen that one auxiliary arrangement is in a double form and comprises a pair of cable or rope drums 48 and 49 mounted at the rear end of the trolley 13 and driven by common motor 50 operating through speed reducers 51 and 52. From the drum 49 a rope or cable 53 is reeved over a block 54 mounted in the forward end of one of the trolley side girders 15, and a sheaved hook 55 depends from that rope as seen in FIGURE 1. A similar hook is mounted on a rope reeved over a block 56 in the forward end of the other trolley side girder 15 and is wound on the drum 48. The two lifts so operated in unison might satisfactorily be used to handle loads approximating 15 tons.

The other auxiliary arrangement includes a frame structure 57 extending forwardly of the crane from the trolley on which it is mounted. This arrangement includes a wheeled trolley 58 ridable on the frame structure 57 and traversed by a pair of lead screws 59—59 driven by an outboard motor 60 through suitable speed reducing means. A lift hook 61 for relatively light loads depends from a cable or rope (not shown) that passes over a sheave 62 on the trolley 58 and back to a drum 63 mounted on the trolley 13 to the rear of the forward cross girder 10. For relatively high speed operation the cable drum 63 is driven by a motor 64 through a suitable speed reducer 65. However, under certain conditions extremely slow speed is desired for the light load hook 61, and to this end a smaller auxiliary motor 66 is mounted on the outer side of one of the girders 15 of the trolley 13, coupled to a speed reducer 67, and the drive shaft from the speed reducer is connected to the shaft of the motor 64 by means of a magnetic coupling 68 whereby slow operation of the hook 61 can be acquired. When the larger and higher speed motor 64 is in operation, the magnetic coupling is automatically deenergized.

The light load hook 61 is preferably supported by a single rope part owing to the fact that the rope support for this hook must necessarily be relatively long and two or more parts may tend to twist. Also this trolley 58 is preferably not traversed with a load on the hook 61 since with a single rope part supporting the hook the load would change as to height. The lead screws 59—59 are sufficiently self-locking to hold the trolley in position when under load.

The auxiliary hoisting mechanisms just above described provide excellent selectivity in the handling of loads of various sizes, and may be operated individually, or conjointly with each other and with the main lift hook 22, as may be desired in any particular set of circumstances.

The Load Equalization Arrangement

From the foregoing description, it will be noted that an effort has been made to maintain the structure of the entire gantry crane substantially symmetrical. It will be noted that the motor, gearing and rope drums for the intermediate load hooks 55 are mounted outboard of the trolley 13 at the rear side thereof while the hooks 55—55 depend on ropes over the blocks 54 and 56 mounted outboard of the opposite or forward side of the trolley. And while the small trolley, its traversing motor, and the hook 61 are outboard of the trolley 13, the rope drum, drive motors and associated mechanisms are between the rails of the trolley 13. Thus the main trolley is counter-balanced against a tendency to tip when live loads are on the auxiliary hoists.

However, because the forward end of the gantry crane must be kept open for load straddling purposes, most of the weight of the crane structure itself will be disposed at the rear end by virtue of the transverse chassis girder 3, the platform 5 carrying the driving mechanisms for the main hoist, the platform 4, operator stand and equipment, etc. Accordingly, regardless of the attempted symmetry of construction and arrangement of parts, the load would not be equalized on the four corner trucks 11 if additional steps were not taken.

To this end, therefore, with reference more particularly to FIGURE 1, it will be seen that the rear upright legs 6 and 7 have a forward slope exceeding the rearward slope of the forward upright legs 8. This arrangement of the upright legs brings the heavy lift load center, or the hook 22, nearer the front trucks 11 than the rear trucks 11. For example, one satisfactory arrangement by way of example, assuming the wheel base to be 18 feet, would be to have the hook 22 disposed one foot nearer the forward trucks than the rear truck. In other words, the center of the hook would be 9'-6" from the rear trucks and only 8'-6" from the forward trucks.

With such structure, the mobility of the trucks, particularly under load conditions is maintained substantially equalized so that the wheels at each corner of the device are subjected to substantially the same resistance to rotation, and each truck is subjected to substantially the same resistance against bodily rotation about its vertical spindle when steering. Since the load is substantially equalized, no adverse effect should occur by way of differential compression of the tires, since any differences in compression of the tires at the four corners of the frame would be negligible. Obviously, the load equalizing arrangement also eliminates scuffing of the tires in turning and steering to a considerable extent.

The Drive and Travel Means for the Gantry Crane

One of the most important features of the instant invention is the means by which the entire gantry crane is caused to travel or peregrinate over the ground, deck of a ship, or in any other location where the crane is to operate, as well as steer the crane so that it travels in precisely the right direction. This is accomplished by motive power means and steering means associated with each of the four trucks 11 disposed under the respective corners of the gantry crane frame or approximately beneath the upright girders or columns of the frame. In other words, each truck is equipped with its own individual drive and steering means.

Obviously, the size and number of wheels utilized in each truck will depend upon the load for which the gantry crane is designed. By way of example, therefore, and not by way of limitation, the trucks are herein disclosed and described for a gantry crane capable of handling a load of 100 tons with the main hoisting mechanism by way of the hook 22. With a gantry crane of this size, it is preferable to utilize four wheels and two drviing motors on each truck, thereby making a total of 16 wheels and 8 driving motors for the entire crane.

With reference now more particularly to FIGURES 8, 9 and 10, with incidental reference to FIGURES 1 and 4, it will be seen that each truck 11 comprises a truck frame or housing 69 through which a fixed axle 70 extends. Mounted for rotation on this axle are four wheels 71, 72, 73 and 74, each of which comprises a suitable interior frame 75, a hollow hub 76, and adequate bearing means 77 between the hub and the axle. Each wheel is preferably covered with a solid tire of rubber or equivalent material as seen clearly in FIGURE 8, solid tires being preferable to pneumatic tires in most cases, particularly when heavy loads are involved, to lessen the amount of squeegee of a tire under load, and to eliminate the possibility of punctures at unfavorable times.

Extending upwardly from the center of the truck housing 69 is a pair of spaced brackets or plates 78—78, FIGURES 1 and 8, between which depend a similar pair of brackets 78a from a sector plate 80 to be later described. Through all four brackets is a trunnion pin 79 which extends at right angles to the truck axle 70. This trunnion pin insures all four wheels of the truck assuming an equal share of the total corner load, thus eliminating stresses and strains tending to distort the truck itself or the gantry crane frame at the corner where each truck is disposed.

The sector plate 80 is fixed to a vertical spindle 81 for rotation therewith when the entire truck is bodily rotated on the spindle 81 to change direction of the wheels. The vertical corner load is relieved by a large thrust bearing 82 disposed below spaced radial bearings 83—83 in a bearing housing 84. At the top of the housing is a bearing retainer plate 85 held in position by a bolt 86 engaged also with a plate 87 secured to the spindle. As indicated diagrammatically in FIGURE 8, the upper portion of the bearing housing may be fixedly connected to a plate 88 disposed on the top of each end of each drop center chassis frame member 1 or 2, the bottom plate for the respective upright leg of the crane frame being disposed on top of the plate 88. Thus, it will be seen that each truck is bodily rotatable with its respective vertical spindle that is carried in the ends of the chassis girders 1 and 2.

A wheel on the outside of the vertical center line of each truck and a wheel on the inner side thereof is driven by its own individual motor. The remaining wheels merely idle. In the illustrated instance, these motors are shown connected to the outside and inside wheels of each truck as indicated by numerals 89 and 90 and seen in FIGURES 2 and 8. In case of FIGURE 8, the motor 89 for the wheel 71 is not illustrated, but the motor 90 appears in driving position for the inner wheel 74. The middle wheels 72 and 73 merely idle. It will be noted from the showing in FIGURE 4, that the drive motors are disposed ahead of the forward trucks, while the drive motors for the rear trucks are disposed behind them, so that all the motors are readily accessible for attention by an operator.

With reference now to FIGURES 8 and 9, it will be seen that each motor operates through reduction gearing in a casing 91 which is of relatively high ratio so that the output shaft 92 from the reduction gearing is driven at relatively slow speed. Keyed to the output shaft 92 is a flanged sleeve 93 around the shank of which a small sprocket 94 may rotate. This sprocket by way of a roller chain or the equivalent 95, shown diagrammatically in FIGURE 1, drives a larger sprocket 96 secured to the hub of the respective wheel of the truck, as seen best in FIGURE 8. The drive from the shaft 92 to the truck wheel is controlled by means of a manually actuated clutch assembly shown in engaged or driving position in FIGURES 8 and 9. The clutch assembly includes a drive plate 97 having affixed thereto a plurality of drive pins 98 which extend through suitable apertures in the flange of sleeve 93 and also through coinciding apertures in a flange 99 fixed to the hub of the sprocket 94. The plate 97 is held in the position illustrated by means of a polygonally headed bolt 100 threaded into the end of the output shaft 92. This bolt 100 may be manipulated by a suitable socket wrench to release it, and the drive plate 97 manually pulled outwardly until the drive pins 98 clear the flange 99 on the sprocket hub. When released, the respective wheel is separated from its respective speed reducer 91. The clutch means are only released when it is desired to tow the gantry crane by a tractor or some other power vehicle, so as to prevent any possible locking of the wheels by way of the speed reducer. For example, a worm speed reducer of high ratio is irreversible and would lock the wheels.

The two motors on each truck are of the reversible type to operate in either direction. Each truck is rotated about its spindle 81 to set the wheels in a desired direction for steering the gantry crane by operating the respective motors in opposite directions. Obviously, during the rotation of a single truck, as well as during turning of the entire gantry crane, there is a differential in speed occurring between the inside and outside wheels relative to the curve of travel. That speed differential may well be compensated for by utilizing drive motors of the wound rotor type with sufficient resistance in the rotor circuits to permit a motor to slow down when required to do so during a turning operation.

Thus, it will be apparent that the motive power units utilized to cause travel of the entire gantry crane are also the means by which each individual truck is rotated bodily to steer the gantry crane in the desired direction. This arrangement eliminates the utilization of costly, cumbersome, and heavy steering mechanism which would also require the use of magnetic clutches acting against the irreversible worm drive. With the present invention, however, the exact desired direction of travel can be established before the gantry crane itself is put into motion.

*The Locking Mechanism to Hold a Truck in Position*

In order to have uniform operation so as to enable the gantry crane to be readily and easily positioned with respect to a load, it is desirable to lock each truck in the position to which it has been bodily rotated in order to determine the direction of movement of the gantry crane. It will be understood, of course, that there are a number of ways and means for locking each truck in a position of angular adjustment with the utilization of reversible worm or spur gear assemblies equipped with magnetic brakes. A relatively small magnetic brake would be sufficient to lock the truck in a desired position, and a reversible worm or spur gear assembly would permit moving a truck to any desired position of angular adjustment and with limit switches and controls identical for each truck all truck axles would be properly related for the desired motion of the crane. Therefore it will be further understood that the locking arrangement particularly illustrated in FIGURES 6 and 7 and herein described is by way of example only.

While tests have indicated that by virtue of the slow speed of travel of the gantry crane extreme exactness in locking the trucks in position is not necessary, it is highly desirable that whatever locking mechanism is utilized it must be positively held against unintentional release, and it must be quickly releasable when desired, regardless of the load being carried and any squeegee action of the tires. The locking mechanism herein set forth simply, effectively, and economically performs those functions.

With reference now to FIGURES 6 and 7, and incidental reference to FIGURES 1 and 4, it will be seen that the locking mechanism for each truck 11 includes the fabricated sector plate 80 connected to the truck spindle 81 for rotation therewith. This sector plate 80 may be fabricated in any suitable manner, but is preferably provided on its curvate edge with a wear plate 101 of hardened metal. In this same curvate edge, a plurality of notches are provided in each of which the wear plate extends, these notches being designated 102, 103, 104, 105, and 106. On the upper surface thereof the sector plate 80 carries a plurality of spaced cam tracks 107, each of which consists of a curvate track having an elevation adjacent one end thereof.

Adjacent the sector is a fabricated shelf structure 108 including upper and lower plates joined together, and between which the sector plate 80 may move. The shelf structure 108 is rigidly connected to the respective end of the lower chassis girder 1 or 2. Extending from the shelf 108 is a plate 109 which carries thereon a plurality of limit switches 110, each of which is cam actuated and includes a roller to ride one of the cam tracks 107. When the roller reaches the rise adjacent the end of the cam track, the respective limit switch is opened. The limit switches are in circuit with the motors 89 and 90 on the respective truck, and when they are opened the motor circuit is likewise opened, stopping the motors.

In order to lock the respective truck in a desired angular position relatively to the gantry crane frame, means are provided for entering a selected one of the notches in the sector plate 80 and thus prevent further bodily rotation of the truck until the engaging means are released. These means include a solenoid 111 secured to a bracket 112 on the shelf 108, there being a reciprocatory rod 113 extending from the core of the solenoid. The other end of the rod 113 is pivotally connected with a pivot pin 114, and the adjacent ends of a pair of toggle levers 115 and 116 are also pivotal on the same pin. The other end of the toggle link 115 is pivoted as at 117 to a bracket 118 mounted on the shelf. The outer end of the toggle link 116 is pivotally connected with a floating pivot pin 119 to which one end of an arm 120 is also pivotally connected, the other end of this arm being keyed to a vertical pivot pin 121 journalled in suitable bearings carried by the shelf 108, as seen best in FIGURE 7. Also keyed to the pin 121 is a double arm 122 carrying on its free end a roller 123 which is sized to enter any of the aforesaid notches in the sector plate 80. The toggle links 115 and 116 are urged to the position seen in FIGURE 6 by a spring 124 around the rod 113, this spring abutting a vertical stop 125 fixed to the shelf 108 and through which the rod 113 extends, and also a flange 126 adjacent the other end of the rod 113. Also, as seen in FIGURE 6, a limit switch 127 may be actuated by movement of the solenoid rod.

The parts are shown in locking position with the roller 123 engaged in the notch 104 of the sector plate 80. Such engagement holds the sector plate and consequently its associated truck against bodily rotating. It will be noted that the holding action is positive, in that the toggle links are urged by the spring 124 into alignment with their adjacent ends abutting a fixed stop 128 on the shelf 108. In such position, the centers of the pivot pins 117, 114, and 119 are in a straight line, and since the arm 120, pivot pin 121, and arm 122 form an integral bellcrank structure, any force exerted by the cam plate tending to throw out the roller 123 from its notch is blocked by the aligned toggle links 115 and 116, and no portion of such force is carried back to the spring 124. The engagement of the roller in the notch is therefore firm and positive and prevents any rotative movement of the sector plate 80.

When it is desired to change the position of the truck, the operator energizes the solenoid 111 to withdraw or pull in the rod 113 thus breaking the straight line association between the toggle pins 115 and 116, pivoting the bellcrank assembly, and throwing the roller 123 out of its notch. Through proper circuit arrangements, the truck motors are then energized to rotate the truck to a predetermined notch, whereupon certain of the limit switches 110 open the circuits to the truck motors and the solenoid 111 is deenergized, permitting the spring 124 to move the toggle arrangement to set position and cause the roller 123 to enter the respective notch in the sector plate.

Any desirable number of locking notches may be provided in the sector plate and in the illustrated instance I have shown five such notches which will provide truck positions for sufficient variation in travel of the gantry crane so that the crane may be readily and easily spotted in substantially any location, even if that location is practically against a wall. However, sufficient limit switches 110 and sufficient cam tracks 107 for all five notches are not illustrated in the drawings for the purpose of avoiding possible confusion by overcrowding of the drawing, the use of such limit switches and cam tracks being perfectly understandable from those shown.

Assuming that the structure of FIGURE 6 is associated with the right-hand forward truck of the crane, the sector plate 80 is locked in position for straight forward or reverse travel, the axle of the truck being at right angles to the longitudinal axis of the crane. With the notches illustrated, the truck may be positioned for the crane to skew right, notch 105; skew left, notch 103; rotate in a tight circle, notch 102; and travel directly sidewise, notch 106. For skewing left or right, the truck axle is rotated in the respective direction approximately 22½°, for rotating in a tight circle, the truck axle is rotated approximately 45°, and for sidewise movement, the truck axle is rotated 90°.

*Various Movements of the Gantry Crane*

In FIGURES 11 to 16 inclusive I have diagrammatically illustrated some of the various directions of travel possible with the instant gantry crane by maneuvering the trucks and locking each truck in position with the apparatus above described. In these figures, the chassis frame of the gantry crane is indicated by dotted lines, with a truck diagrammatically shown at each corner thereof, straight forward movement of the crane being toward the bottom of the sheet, and straight reverse movement of the crane being toward the top of the sheet. It is to be assumed that the driver is at the rear of the crane facing forwardly toward the bottom of the sheet. For purposes of convenience, therefore, I have designated the forward right truck as 11a, the forward left truck as 11b, the rear left truck as 11c, and the rear right truck as 11d. The sector plate 80 is preferably arranged with each respective truck so that regardless of the positions of the trucks, the motors thereon are disposed to the outside as much as possible.

In FIGURE 11, all trucks are shown in alignment with their axles perpendicular to the longitudinal axis of the crane, for direct forward and direct reverse movement depending upon the direction of operation of the truck motors, as indicated by the arrow 129.

FIGURE 12 shows all four trucks skewed left, and with the trucks in this position, the gantry crane may travel forward or reverse along a line at an angle of approximately 22½° to the straight forward and reverse line, this travel being indicated by the arrow 130.

FIGURE 13 shows the trucks skewed in the opposite direction for what is termed "skew right" travel of the gantry crane, and with the trucks so arranged the gantry crane may move forward or reverse along a line indicated by the double headed arrow 131.

In FIGURE 14 all of the trucks are shown bodily rotated a total of 90°, whereupon the gantry crane may move straight sidewise in either direction as indicated by the arrow 132. It will be noted with this arrangement of the trucks, the gantry crane may be moved straight toward and substantially against a vertical wall, thus avoiding any possible accidents contingent upon endeavoring to bring the truck adjacent a wall at an angle, or resulting from attempting to drive the truck parallel with the wall but very close thereto to reach a desired position.

It will be noted that in all four of the above described movements of the crane, the fixed truck axles are all parallel to each other, and in the case of FIGURE 14, the axles of trucks 11a and 11d, and the axles of trucks 11b and 11c, are in the same straight lines.

In FIGURE 15, all of the trucks have been rotated to an angle of approximately 45°, and with the trucks in this position, the gantry crane may be rotated in an extremely small circle, in either direction. It will be noted that if the chassis frame of the crane forms three sides of a square, the gantry crane would be rotated around the center of the chassis frame, in other words it could make a revolution in its own length. In any event, it will be noted that the truck 11a has its axle in alignment or parallel to the truck 11c, while the truck 11b has its axle in alignment or parallel to that of the truck 11d. Consequently, the gantry crane will turn about a center point that will be approximately in the region of intersection of diagonal lines through the opposite corner axles.

In FIGURE 16, the forward trucks 11a and 11b are illustrated as skewed left, while the rear trucks 11c and 11d remain in straight forward or reverse position. It has been found possible to operate the gantry crane with this arrangement of trucks, without any undue scuffing of the tires on the rear trucks 11c and 11d. With this arrangement, the entire gantry crane may be angled as desired, or rotated through a circle of relatively large diameter.

While in most cases it is preferable to set the trucks at the desired angular relationship to the crane frame while the crane is stationary, it is possible, of course, to acquire certain changes in direction while the gantry crane is in motion. Also, it should be noted that as stated above these diagrammatic figures of the drawing illustrate some, but not all of the possible movements of the crane, but the movements herein illustrated are quite sufficient to properly, quickly, and easily position the gantry crane accurately at a desired location for practically all circumstances. If, for any reason, additional movements of the gantry crane are desired, more notches and more controls may be added to the sector plate 80 or, should a worm and gear adjustment means or locking means be utilized, the trucks could be rotated bodily to substantially any desired angle.

*The Gantry Crane Towing Linkage*

When moved from a place of storage to a place of operation, or otherwise transferred over a relatively great distance exceeding the length of an electrical cable, the gantry crane is towed by a tractor or other power vehicle. To permit such towing, the gantry crane is provided with a known form of automotive steering linkage. This linkage is somewhat diagrammatically illustrated in FIGURE 4 of the drawings, and includes a draw bar 133 pivoted as indicated at 134 to the rear chassis girder 3 with its offset rear end pivoted to a drag link 135 which is in turn pivoted at its other end to a plate 136 fixed to the right rear truck 11. Another plate 137 fixed to the same truck is cross connected to a similar plate 138 on the left rear truck by a tie rod 139 pivoted to both plates. Thus, when the draw bar 133 is angled to either side, the trucks are angled in the same manner by virtue of the movement of the drag link and tie rod.

Of course, when a towing operation is to be instituted, it is necessary to manually withdraw the clutch plates 97 and pins 98 associated with both motors on each truck. When the crane arrives at operating location, the clutch plates are moved back into engaged position so that the crane may be electrically operated.

Operation of the Gantry Crane

The operation of the instant invention is extremely simple and can be accomplished with only one operator upon the crane. Of course, one or more other operators are desirable to adjust the respective lift hooks to the loads, release the hooks and ascertain proper positioning of the loads, etc. The crane operator, however, need only move designated switches or push buttons to effect the various controls desired. By proper operation of the eight truck motors, the gantry crane may be cause to travel and be steered in the proper and desired direction, even to a movement straight sidewise. Thus, the crane may be accurately positioned to almost a precise degree. By virtue of the truck locking means the trucks remain in angular positions of adjustment as long as desired, and may quickly be released for adjustment to a different position.

When at load receiving or load delivering position, the various hoisting mechanisms may be selectively operated as desired, singly or conjointly. The trolley carrying the main lift hook 22 may be accurately positioned and locked in that position by virtue of the lead screw drive and brake therefor. The same is true in connection with the small trolley associated with the light lift hook on the end of the main trolley.

The cable or rope reeving with the heavy hoist drums disposed at an extremely low point on the crane frame adds to the stability of the crane as a whole and eliminates top heaviness, and the fact that the lifting beam and hook 22 are carried by the bight of the cables or ropes rather than at the ends thereof permits a higher or lower travel of the load with only moderate size cable drums.

In addition, the forward slope of the rear columns or upright legs of the gantry frame, exceeding the rearward slope of the forward upright legs, equalizes the load on each of the four corner trucks, so that each truck may be manipulated with the same freedom as any other truck. Thus, the operation of the entire crane, is simple, positive, and notwithstanding the essential bulk and weight of the crane, it may be moved and operated with great facility and versatility.

It will be understood that modifications and variations may be effected without departing from the scope of the novel concepts of the present invention.

I claim as my invention:

1. In a mobile gantry crane, a frame structure having four corners, hoisting mechanism on said structure, a multiple-wheeled truck at each corner of said frame structure, a vertical spindle on each truck about which the truck is bodily rotatable, and separate drive means on each said truck operable independently of those on any other truck to both rotate the wheels thereof and bodily position the truck to steer the gantry crane.

2. In a mobile gantry crane, a frame structure, hoisting mechanism on said structure, a multiple-wheeled truck at each corner of said frame structure, a vertical spindle on each truck about which the truck is bodily rotatable, and separate and independently operable drive means on each said truck to both rotate the wheels thereof and bodily position the truck to steer the gantry crane, and mechanical interlocking means associated with each truck to hold the same in a desired angular position relatively to the longitudinal axis of the frame structure.

3. In a mobile gantry crane, a frame structure having four corners, hoisting mechanism on said frame structure, a multiple-wheeled truck connected to each corner of said frame structure for rotation bodily relatively to the frame structure, a reversible drive motor on each truck connected to actuate the outer wheel of the truck, and a reversible drive motor on each truck connected to actuate the inner wheel of the truck, whereby each truck may be separately rotated to a desired angular position relatively to the frame structure by operating the motors thereon in opposite directions to steer the gantry crane.

4. In a mobile gantry crane, a frame structure, hoisting mechanism on said frame structure, a truck at each corner of said frame structure to support the crane, each truck having in excess of two wheels thereon, and a separate drive motor on each truck for each of the outer and inner wheels of the truck, the intermediate wheels of the trucks idling during movement of the crane.

5. A truck for a mobile gantry crane having a frame carrying hoisting mechanism thereon, said truck comprising a housing, a fixed axle carried by said housing, a plurality of wheels exceeding two in number rotatable on said axle, a separate reversible motor on said housing for each of the outer and inner wheels, drive connections between each motor and the respective wheel, and a spindle extending upwardly from said housing and about which the entire truck is bodily rotatable.

6. In a mobile gantry crane, a chassis frame structure, a truck beneath each corner of said frame structure, each said truck comprising a housing, a fixed axle carried by said housing, four wheels mounted for rotation on said axle, a separate drive motor on said housing for each of two wheels respectively outside and inside the vertical center line of the truck, and driving connections between each said motor and its respective wheel, the remainder of the wheels being idlers.

7. In a mobile gantry crane, a chassis frame structure, a truck beneath each corner of said frame structure, each said truck comprising a housing, a fixed axle carried by said housing, four wheels mounted for rotation on said axle, a separate drive motor on said housing for each of two wheels respectively outside and inside the vertical center line of the truck, driving connections between each said motor and its respective wheel, the remainder of said wheels being idlers, and an uprght spindle connected to the top of said housing and to the respective corner of said chassis frame structure and about which the entire truck is bodily rotatable.

8. In a mobile gantry crane, a chassis frame structure, a truck beneath each corner of said frame structure, each said truck comprising a housing, a fixed axle carried by said housing, a plurality of wheels rotatable on said axle, a separate reversible drive motor for each of two wheels respectively outside and inside the vertical center line of the truck, driving connections between each said motor and its respective wheel, an upright spindle journalled in said chassis frame structure, confronting members on said spindle and said housing, and a trunnion pin through said members transversely to said axle to connect said housing to said spindle for bodily rotation.

9. In a mobile gantry crane, a frame structure carrying hoisting means, a multiple-wheeled truck assembly under each corner of said frame structure, a separate reversible drive motor on each said assembly for each of two wheels respectively outside and inside the vertical center line of the truck, said assembly being mounted for bodily rotation about a vertical axis, a member fixed to said assembly to rotate therewith, and holding means mounted on said frame structure to mechanically interlock with said member and hold the same and the truck assembly in a desired angular position relatively to said frame structure.

10. In a mobile gantry crane, a frame structure carrying hoisting means, a multiple-wheeled truck assembly under each corner of said frame structure, a separate reversible drive motor on each said assembly for each of two wheels respctively outside and inside the vertical center line of the truck, said assembly being mounted for bodily rotation about a vertical axis, a member having spaced notches in the peripheral edge thereof fixed to said assembly to rotate therewith, a movable member carried by said frame structure including means to selectively seat in one of said notches and lock the truck assembly in a desire dangular position relatively to said frame structure, and actuating means for said movable member.

11. In a mobile gantry crane, a frame structure carrying hoisting apparatus, a wheeled truck under each corner of said frame structure mounted for bodily rotation about a vertical axis to steer the gantry crane, means to selectively rotate each said truck a predetermined amount, a member having spaced notches in the edge thereof connected to each said truck to rotate therewith, and holding means mounted on said frame structure adjacent each said member and including an element selectively interlockable in one of said notches to lock the respective truck in a desired angular position relatively to said frame structure.

12. In a mobile gantry crane, a frame structure carrying hoisting apparatus, a wheeled truck under each corner of said frame structure mounted for bodily rotation about a vertical axis to steer the gantry crane, means to selectively rotate each said truck a predetermined amount, a sector plate having spaced notches in the arcuate edge thereof connected to each truck to rotate therewith, a shelf structure fixedly connected to said frame structure adjacent each said sector plate, an arm pivoted on said shelf structure and having a member to selectively enter one of said notches to lock the respective truck in a desired angular position relatively to said frame structure, a toggle linkage to actuate said arm and firmly hold the same in locked position, and actuating means for said toggle linkage.

13. In a mobile gantry crane, a frame structure carrying hoisting apparatus, a wheeled truck under each corner of said frame structure mounted for bodily rotation about a vertical axis to steer the gantry crane, means to selectively rotate each said truck a predetermined amount, a member having spaced notches in the edge thereof connected to each said truck to rotate therewith, and holding means mounted on said frame structure adjacent each said member and including an element selectively interlockable in one of said notches to lock the respective truck in a desired angular position relatively to said frame structure, the notches in each said member being arranged to permit bodily rotation of each truck in either direction and as much as 90° in one direction.

14. In a mobile gantry crane, a chassis frame, uprights on said chassis frame, a transverse frame on said uprights, a wheeled truck under each corner of said chassis frame, a rope hoisting drum on each side of said chassis frame, drum rotating mechanism on said chassis frame, multi-sheave blocks on said transverse frame, a pair of lift ropes each having its ends secured one to each of said drums, a lifting beam carrying a lift hook, multi-sheaved blocks on said lifting beam, and the intermediate portion of each said rope being reeved over the sheaves of a block on the transverse frame and a block on said lifting beam.

15. In a mobile gantry crane, a chassis frame, uprights on said chassis frame, a transverse frame on said uprights, a wheeled truck under each corner of said chassis frame, a rope hoisting drum on each side of said chassis frame, drum rotating mechanism on said chassis frame, multi-sheave blocks on said transvers frame, a pair of lift ropes each having its ends secured one to each of said drums, a lifting beam carrying a lift hook, multi- sheaved blocks on said lifting beam, and the intermediate portion of each said rope being reeved over the sheaves of a block on the transverse frame and a block on said lifting beam, said rotating mechanism including a single motor geared to the shafts of said drums to operate the drums in unison but in opposite directions.

16. In a crane, a frame structure including uprights and an upper transverse frame thereon, spaced trolley rails on said upper frame, a trolley including a frame and wheels to ride said rails, a fixed nut on said trolley frame in the vicinity of each rail, a lead screw for each nut journalled on said trolley frame and threadedly engaged with the respective nut, a reversible motor carried by said upper frame and connected to drive both said screws in unison to traverse the trolley on said rails, and hoisting means carried by said trolley.

17. In a crane, a frame structure including uprights and an upper transverse frame thereon, spaced trolley rails on said upper frame, a trolley including a frame and wheels to ride said rails, a fixed nut on said trolley frame in the vicinity of each rail, a lead screw for each nut journalled on said trolley frame and threadedly engaged with the respective nut, a reversible motor carried by said upper frame and connected to drive both said screws in unison to traverse the trolley on said rails, a second trolley on the first said trolley to travel thereon in a direction at right angles to the direction of travel of the first said trolley, a pair of lead screws to drive the second trolley, a separate reversible motor to actuate the lead screws for the second trolley, and separate hoisting mechanisms associated with said trolleys.

18. In a mobile gantry crane, an open-end chassis frame including side girders and one transverse end girder, a wheeled truck under each end of each side girders, an upright leg at each end of each of said side girders, an upperdeck frame on said upright legs, hoist rope sheaves carried by said upperdeck frame, rope drums on said chassis side girders, ropes connected to said drums and reeved over said sheaves, a lift hook assembly depending from the bight of said ropes below said sheaves, drive means for said drums on said chassis frame adjacent said end girder, and the upright legs adjacent the ends of said transverse end girder having a forward slope sufficient to center the load with respect to said wheeled trucks and compensate for the weight of said end girder and said drive means.

19. In a mobile gantry crane, a chassis frame structure closed at one end and open at the other to straddle a load, wheeled trucks under said chassis frame, a superstructure on said chassis frame including a pair of forward legs at the open end of the chassis frame and a pair of rear legs at the closed end, hoisting means on said chassis frame and superstructure, mechanism to actuate said hoisting means carried by said chassis frame adjacent the closed end thereof, and said rear legs sloping forwardly sufficiently to equalize the load on the trucks and compensate for the added weight at the closed end of the chassis frame.

20. In a mobile gantry crane, a chassis frame, a multiple-wheeled truck beneath each corner of said chassis frame, drive and steering means individually carried by each said truck for the wheels of the respective truck, locking means associated with each said truck to hold the same at a desired angular position relatively to said chassis frame, a superstructure on said chassis frame including uprights and an upperdeck frame thereon, a trolley to traverse said upperdeck frame, sheave blocks on said trolley, hoist rope drums on said chassis frame, drum drive means on said chassis frame, ropes secured to said drums and reeved over said sheave blocks, a load hook assembly depending from the bight of the ropes below said sheave blocks, other and lighter hoisting mechanism and drive means therefor carried by said trolley, a second smaller trolley on the first said trolley, additional hoisting mechanism on said second trolley, and drive means for said additional hoisting mechanism carried by the first said trolley.

References Cited in the file of this patent

UNITED STATES PATENTS

| | | |
|---|---|---|
| 641,514 | Hunt | Jan. 16, 1900 |
| 1,612,393 | Mossay | Dec. 8, 1926 |
| 1,716,732 | Mossay | June 11, 1929 |
| 1,828,905 | Mossay | Oct. 27, 1931 |
| 2,063,909 | Fitch | Dec. 15, 1936 |
| 2,101,837 | Blanchett | Dec. 14, 1937 |
| 2,362,636 | Joy | Nov. 14, 1944 |
| 2,425,089 | Diaz | Aug. 5, 1947 |
| 2,526,307 | Varda | Oct. 17, 1950 |
| 2,772,004 | Noble | Nov. 27, 1956 |
| 2,798,565 | Rosenthal et al. | July 9, 1957 |
| 2,909,298 | Baudhuin | Oct. 20, 1959 |
| 2,954,136 | Butler et al. | Sept. 27, 1960 |